United States Patent
Krishnamoorthy et al.

(10) Patent No.: US 11,166,152 B2
(45) Date of Patent: Nov. 2, 2021

(54) SIB ACQUISITION OPTIMIZATIONS FOR INTRA-PLMN MULTI-SIM UES

(71) Applicant: QUALCOMM Incorporated, San Diego, CA (US)

(72) Inventors: Parthasarathy Krishnamoorthy, San Diego, CA (US); Tao Luo, San Diego, CA (US); Ozcan Ozturk, San Diego, CA (US); Chetan Chakravarthy, San Diego, CA (US); Krishna Rao Mandadapu, San Diego, CA (US); Vijay Marwah, Rancho Santa Fe, CA (US); Mueez Ahmad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/681,291

(22) Filed: Nov. 12, 2019

(65) Prior Publication Data
US 2021/0144545 A1    May 13, 2021

(51) Int. Cl.
*H04W 8/08*    (2009.01)
*H04W 8/20*    (2009.01)
(Continued)

(52) U.S. Cl.
CPC .......... *H04W 8/205* (2013.01); *H04W 48/10* (2013.01); *H04W 74/0833* (2013.01); *H04W 84/042* (2013.01); *H04W 88/06* (2013.01)

(58) Field of Classification Search
CPC .......................... H04W 48/10; H04W 47/0833
See application file for complete search history.

(56) References Cited

U.S. PATENT DOCUMENTS

| | | | |
|---|---|---|---|
| 2015/0017982 A1* | 1/2015 | Klatt | H04W 36/14 455/434 |
| 2015/0057046 A1* | 2/2015 | Challa | H04W 68/12 455/558 |

(Continued)

OTHER PUBLICATIONS

International Search Report and Written Opinion—PCT/US2020/060058—ISA/EPO—dated Feb. 26, 2021.

(Continued)

*Primary Examiner* — Dai Phuong
(74) *Attorney, Agent, or Firm* — Nerrie M. Zohn

(57) ABSTRACT

A multi-SIM UE may perform network SIB acquisition for each network subscription. However, if the multi-SIM UE employs subscriptions for the same network these operations may be performed redundantly. By identifying that the UE is employing multiple subscriptions, the UE and network can perform a single SIB acquisition for multiple subscriptions, which reduces power consumption and optimize network signaling overhead. In an aspect of the disclosure, a method, a computer-readable medium, and an apparatus are provided. The apparatus may be a UE configured to determine that the UE is associated with a plurality of network subscriptions, the plurality of network subscriptions being associated with a network, select a network subscription from the plurality of network subscriptions, perform a random-access procedure using the network subscription, receive system information broadcast in response to the random-access procedure, and configure the plurality of network subscriptions at the UE based on the system information.

31 Claims, 6 Drawing Sheets

(51) Int. Cl.
*H04W 48/10* (2009.01)
*H04W 74/08* (2009.01)
*H04W 84/04* (2009.01)
*H04W 88/06* (2009.01)

(56) References Cited

U.S. PATENT DOCUMENTS

| | | | | |
|---|---|---|---|---|
| 2015/0078334 | A1* | 3/2015 | Peruru | H04W 76/10 |
| | | | | 370/331 |
| 2016/0249320 | A1* | 8/2016 | Sanka | H04W 68/02 |
| 2016/0262088 | A1* | 9/2016 | Frenger | H04W 74/0833 |
| 2016/0295541 | A1 | 10/2016 | Jaiswal et al. | |
| 2016/0302233 | A1* | 10/2016 | Gopala Krishnan | |
| | | | | H04W 74/0833 |
| 2018/0132146 | A1* | 5/2018 | Lee | H04W 36/0007 |
| 2020/0015281 | A1* | 1/2020 | Zhang | H04W 72/0446 |
| 2020/0037147 | A1* | 1/2020 | Lim | H04W 60/04 |
| 2020/0413439 | A1* | 12/2020 | Kim | H04W 48/14 |

OTHER PUBLICATIONS

LG Electronics Inc: "Other-SI Request and Acquisition in IDLE/INACTIVE", 3GPP Draft, 3GPP TSG-RAN WG2 Meeting #98, R2-1705229 Other-SI Request and Acquisition in IDLEINACTIVE, 3rd Generation Partnership Project (3GPP), Mobile Competence Centre, 650, Route Des Lucioles, F-06921 Sophia-Antipolis Cedex vol. RAN WG2, No. Hangzhou, China, May 15, 2017-May 19, 2017 May 14, 2017 (May 14, 2017), XP051275699, pp. 1-4, Retrieved from the Internet: URL: http://www.3gpp.org/ftp/Meetings_3GPP_SYNC/RAN2/Docs/ [retrieved on May 14, 2017], section 2, figure 1.

* cited by examiner

SIB ACQUISITION OPTIMIZATIONS FOR INTRA-PLMN MULTI-SIM UES

BACKGROUND

Technical Field

The present disclosure relates generally to communication systems, and more particularly, to a system information acquisition for MSIM devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple access technologies have been adopted in various telecommunication standards to provide a common protocol that enables different wireless devices to communicate on a municipal, national, regional, and even global level. An example telecommunication standard is 5G New Radio (NR).

5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

A Multiple Subscriber Identify Module (MSIM) capable User Equipment (UE) may operate in a connected mode on a first subscription with a first network while operating in an idle mode or an active mode on a second subscription. A MSIM UE may perform network SIB acquisition for each network subscription. However, if the MSIM UE employs subscriptions for the same network these operations may be redundant. By identifying that the UE is employing multiple Intra-PLMN subscription, the UE can perform a single SIB acquisition for multiple subscriptions and thereby reduce power consumption and optimize network signaling overhead.

In an aspect of the disclosure, a method, a computer-readable medium, and an apparatus are provided. The apparatus may by a UE, such as a multi-SIM UE. The apparatus may be configured to determine that the UE is associated with a plurality of network subscriptions, the plurality of network subscriptions being associated with a network, select a network subscription from the plurality of network subscriptions, perform a random-access procedure using the network subscription, receive system information broadcast in response to the random-access procedure, the system information being associated with the network, and configure the plurality of network subscriptions at the UE based on the system information. The network subscription may be selected based on at least one channel quality measurement. The at least one channel quality measurement may include one or more of a synchronization signal block reference signal receive power, a reference signal receive quality, and a signal-to-noise-ratio associated with a synchronization signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
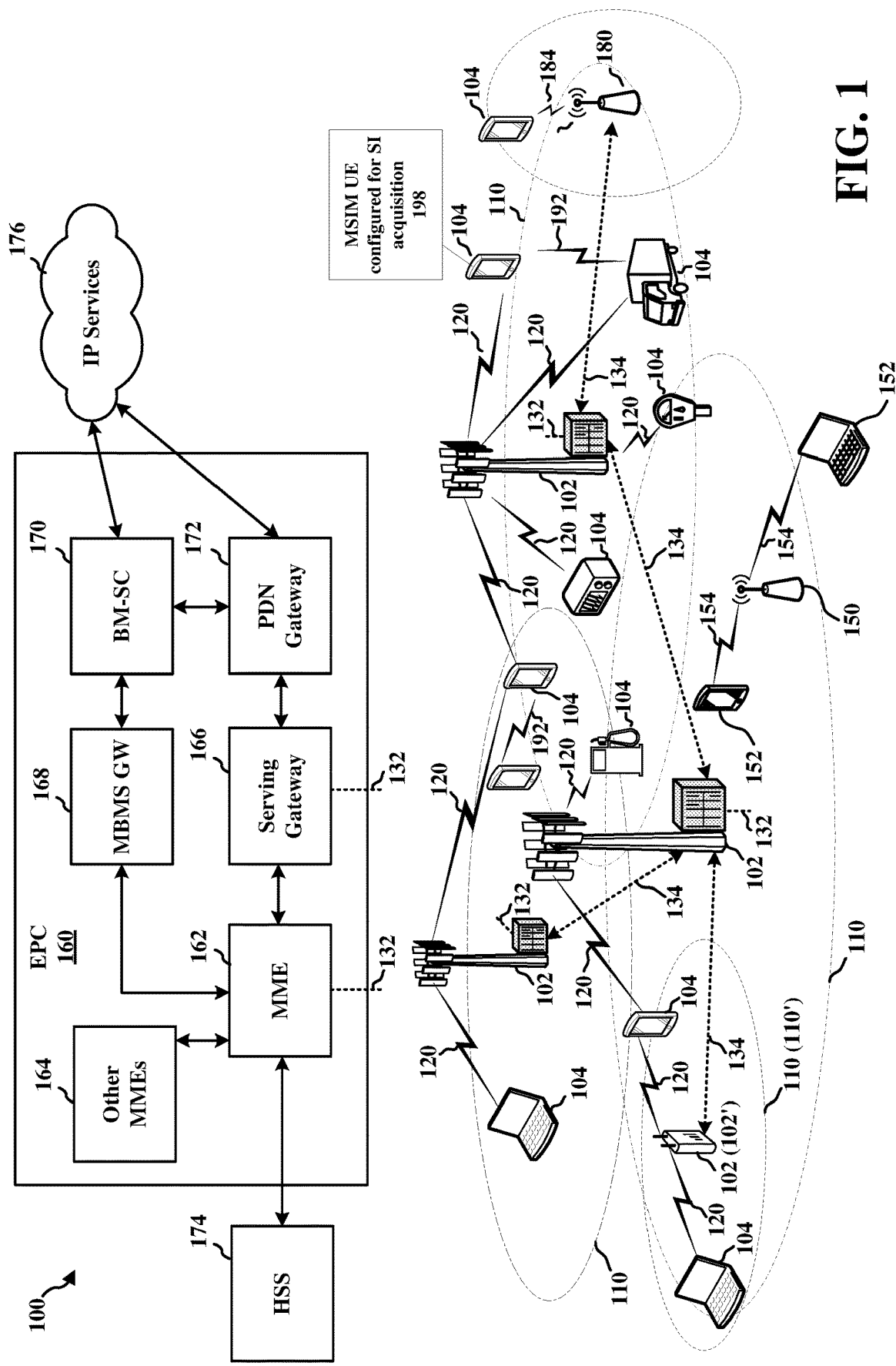
FIG. 1 is a diagram illustrating an example of a wireless communications system and an access network according to some embodiments.

The detailed description set forth below in connection with the appended drawings is intended as a description of various configurations and is not intended to represent the only configurations in which the concepts described herein may be practiced. The detailed description includes specific details to provide a thorough understanding of various concepts. However, it will be apparent to those skilled in the art that these concepts may be practiced without these specific details. In some instances, well-known structures and components are shown in block diagram form to avoid obscuring such concepts.

A Multiple Subscriber Identify Module (MSIM) capable User Equipment (UE) may operate in a connected mode on a first subscription with a first network while operating in an idle mode or an active mode on a second subscription. The MSIM UE may perform various network operations for each network subscription. However, when the MSIM UE employs subscriptions for the same network these operations may need to be performed using redundant system information acquisitions for each subscription. By identifying that the UE is an MSIM Intra-PLMN UE, the UE can reduce the need for redundant system information acquisitions. Accordingly, the present invention provides power-saving at the UE and reduces network signaling overhead by optimizing communication for MSIM UE with multiple subscriptions for the same network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., an X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase the capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a prosthetic, medical device, entertainment device, industrial equipment, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be a MSIM UE configured for system information acquisitoin 198.

Figure 2:
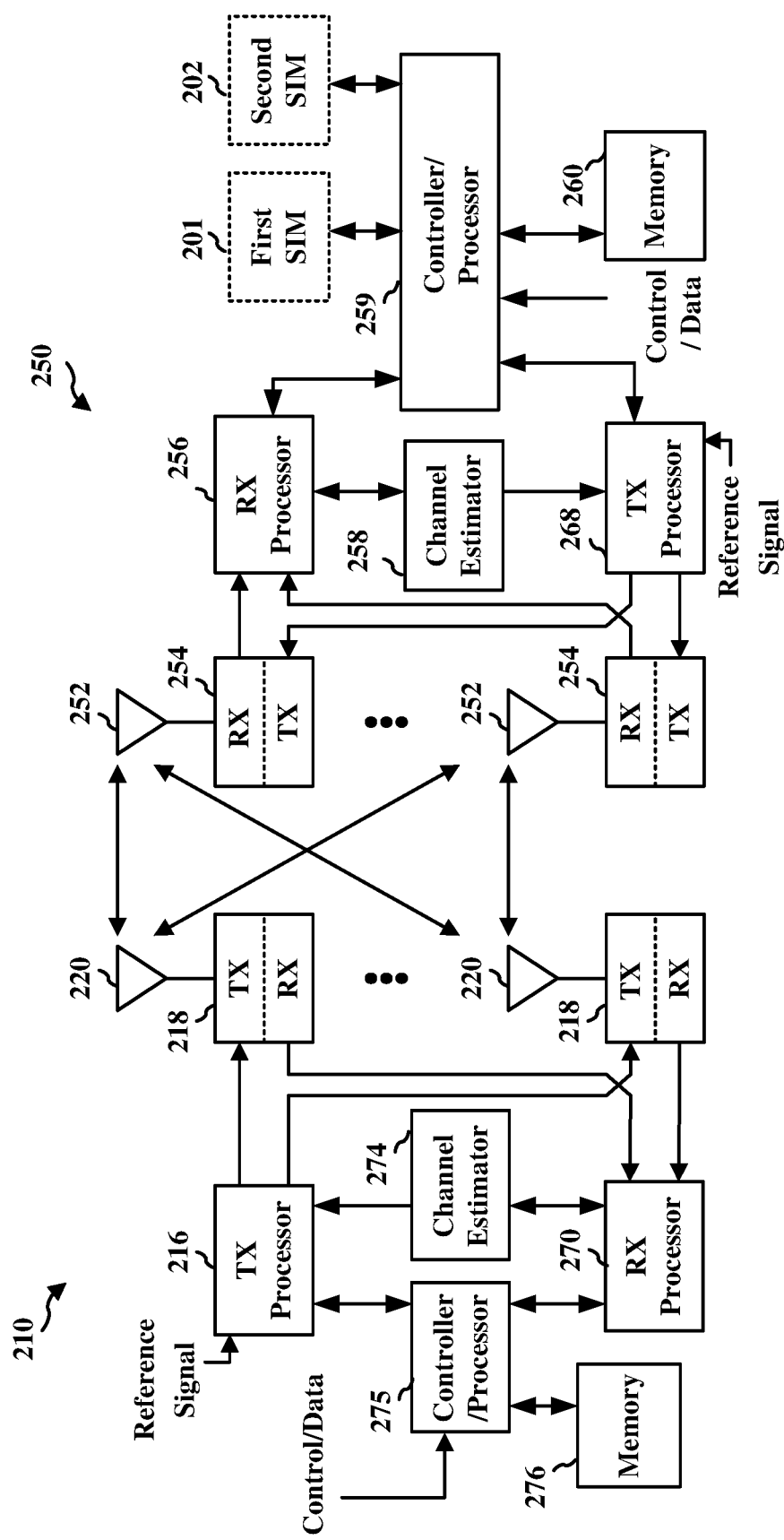
FIG. 2 is a diagram illustrating an example of a base station and user equipment (UE) in an access network according to some embodiments.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 2 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 similarly to the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

Various wireless communication technologies may have a different frame structure and/or different channels. A frame may be divided into multiple (e.g., 10) equally sized subframes. Each subframe may include multiple consecutive time slots (based on the type of numerology). A resource grid may be used to represent time slots, each time slot may include one or more time concurrent resource blocks (RBs) (also referred to as physical RBs (PRBs)). The resource grid is divided into multiple resource elements (REs). For a normal cyclic prefix, an RB may contain consecutive subcarriers in the frequency domain and consecutive symbols The number of bits carried by each RE depends on the modulation scheme.

Some of the REs may carry reference (pilot) signals (RS) for downlink channel estimation at the UE. These RS may include cell-specific reference signals (CRS) (also sometimes called common RS), UE-specific reference signals (UE-RS), and channel state information reference signals (CSI-RS).

Various channels may exist within a DL subframe. The PDCCH carries downlink control information (DCI) within one or more control channel elements (CCEs), each CCE including multiple RE groups (REGs), each REG including a number of consecutive REs in an OFDM symbol. A UE may be configured with a UE-specific enhanced PDCCH (ePDCCH) that also carries DCI. The physical hybrid automatic repeat request (ARQ) (HARQ) indicator channel (PHICH) carries the HARQ indicator (HI) that indicates HARQ acknowledgement (ACK)/negative ACK (NACK) feedback based on the success of decoding a physical uplink shared channel (PUSCH). A primary synchronization signal (PSS) may serve to determine subframe/symbol timing and a physical layer identity. A secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the downlink RS. A physical broadcast channel (PBCH), carries a master information block (MIB). The PBCH may be logically grouped with the PSS and SSS to form a synchronization signal (SS) block (SSB). The MIB provides system configuration information, including a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

Uplink subframes may include REs that carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

A physical random access channel (PRACH) may be within one or more subframes within a frame based on the PRACH configuration. The PRACH may include consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

A wireless communication device may include one or more subscriber identity modules (SIMs) that provide access to one or multiple separate mobile communication networks that implement certain radio access technologies (RATs). Example UEs include, but are not limited to, mobile phones, laptop computers, smartphones, and other mobile communication devices of the like that are configured to connect to one or more RATs. These devices may have Multiple Subscriber Identity Module (MSIM) capability. FIG. 2, for example, illustrates a UE having multiple SIMs (e.g., a first SIM 201 and a second SIM 202). Although two SIMs are illustrated, aspects described herein may be similarly applied to a device comprising more than two SIMs. Having multiple SIMs may enable a single device to use different numbers for voice calls. Multiple SIMs may enable the device to operate using more than one network subscription and/or more than one network. Such a wireless communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), 5G New Radio (NR), Global System for Mobility (GSM), and Wideband Code Division Multiple Access (WCDMA)). To use different frequency systems and/or radio access technologies, a wireless communication device may include two or more radio transceivers.

As noted, a SIM enables the wireless communication device to access one or more communication networks (or one or more subscriber accounts on the same network). A SIM card may identify and authenticate a subscriber using a particular communication device, and the SIM card may be associated with a subscription. In various embodiments, the wireless communication device may also include one or more RF resource chains that may each be used for RF reception and transmission. As used herein, the terms "SIM," "SIM card," "subscriber identity module," and variants thereof are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information stored in a particular SIM, as the SIM and the communication network (as well as the services and subscriptions supported by that network) correlate to one another. Similarly, the term "subscription" may refer to a network subscription or service associated with a particular SIM.

In general, a wireless device that includes multiple SIMs and can be connected to two or more separate (or same) RATs using the same transmission hardware (e.g., radio-frequency (RF) transceivers) is a multi-SIM-multi-standby (MSMS) communication device. In one example, the MSMS communication device may be a dual-SIM-dual-standby (DSDS) communication device, which may include two SIM cards/subscriptions that may both be active on standby, but one is deactivated when the other one is in use. In another example, the MSMS communication device may be a triple-SIM-triple-standby (TSTS) communication device, which includes three SIM cards/subscriptions that may all be active on standby, where two may be deactivated when the third one is in use. In other examples, the MSMS communication device may include other suitable multi-SIM communication devices, with, for example, four or more SIMs, such that when one is in use, the others may be deactivated.

On the other hand, a wireless device with multiple SIMs that can connect to two or more separate (or same) RATs using two or more separate sets of transmission hardware is termed a multi-SIM-multi-active (MSMA) communication device. An example MSMA communication device is a dual-SIM-dual-active (DSDA) communication device, which includes two SIM cards/subscriptions. Both SIMs may remain active. In another example, the MSMA device may be a triple-SIM-triple-active (TSTA) communication device, which includes three SIM cards/subscriptions. All three SIMs may remain active. In other examples, the MSMA communication device may include other suitable MSIM communication devices with four or more SIMs, which may all be active.

Various aspects and embodiments described herein relate to, but are not limited to, a MSIM context such as the MSMS and MSMA contexts. For example, in the MSIM context, each subscription may be configured to acquire service from a base station (associated with a given cell). For clarity, various aspects and embodiments described herein refer to a UE with two subscriptions. However, a UE with only one SIM and one subscription may suitably implement various aspects and embodiments described herein, as can a UE with three or more SIMs and three or more subscriptions.

By example, a common MSIM device may include a dual-SIM UE (such as DSDS or DSDA device). Such a MSIM UE may be a 5G+5G MSIM device (including two 5G SIMs corresponding to two 5G subscriptions) or a 5G+4G MSIM device (including one 5G SIM and one LTE SIM corresponding to a 5G subscription and a 4G LTE subscription). In a common scenario, the MSIM UE may be configured with two SIMs for the same operator, e.g., a user may install one SIM for business/official and another SIM for personal use in a single UE hardware device. In such scenarios, both SIMs commonly correspond to the same network operator, a configuration referred to hereinafter as Intra-PLMN. A MSIM UE configured as Intra-PLMN, may perform redundant operations with the same network when initializing, configuring, and updating the respective network subscriptions associated with each SIM. Among the redundant operations that may be performed by dual-SIM UE is SIB acquisition for on-demand SIBs.

NR, like LTE and other legacy technologies, includes periodic transmission of system information. However, unlike LTE and legacy technology, not all system information in NR is periodically transmitted. NR includes to two types of SIBs. One SIB type is transmitted periodically, like LTE, and the other is transmitted on-demand i.e. when requested by UE. A 5G network will primarily broadcast critical system information like MIB and SIB1 periodically. However, non-critical system information will be transmitted on-demand, in response to UE requests. UEs can trigger the transmission of on-demand SIBs by sending a RACH requesting a SIB transmission. This may be referred to as a system information (SI)-RACH. The SI-RACH uses a unique preamble to trigger SI transmission by the network. SIB1, sent periodically, indicates which other SIBs are periodic and which SIBS are on-demand. By reading SIB1, a UE can determine which SIBs require a RACH trigger.

Various aspects and embodiments described herein relate to, but are not limited to, a MSIM context such as the MSMS and MSMA contexts. For example, in the MSIM context, each subscription may be configured to acquire service from a base station (associated with a given cell). For clarity, various aspects and embodiments described hereinafter as an MSIM UE refer to a MSIM UE with two subscriptions to the same network operator (i.e., MSIM Intra-PLMN). However, a UE with three or more SIMs and three or more subscriptions may suitably implement various aspects and embodiments described herein. The MSIM UE may be a 5G+5G MSIM Intra-PLMN UE or 5G+4G MSIM Intra-PLMN UE including a first SIM and a second SIM. Furthermore, reference will be made to a first subscription associated with the first SIM and a second subscription associated with the second SIM. Both the first subscription and the second subscription are associated with the same cellular network. Additionally, while reference hereinafter is made to a dual-SIM device, the described concepts are equally applicable to multi-SIM Intra-PLMN devices that have three or more active SIMs and subscriptions.

A MSIM UE may perform various network operations redundantly for each subscription corresponding to each active SIM. These common network operations may include system acquisition and configuration. Conventionally, a MSIM UE would need to configure each subscription individually, by repeatedly acquiring the necessary SIBs for each subscription. However, since all the SIMs in the Intra-PLMN MSIM device operate from within the same hardware/phone, they are in the same location and measure similar network channel quality. Therefore, the subscriptions (associated with these SIMs) will generally attach to the same network cell. Therefore, the system information for all the network subscriptions would be the same. Accordingly, power-saving and network signaling overhead optimization may be achieved by leveraging the Intra-PLMN status of subscriptions at the UE.

In one aspect, the MSIM UE may determine that the two (or more) active subscriptions are associated with the same network. Internal software can identify whether the subscriptions in the MSIM device are Intra-PLMN (attached to a same cell and/or beam) or Inter-PLMN (employing different cellular networks). Once the UE identifies that the subscriptions are Intra-PLMN, then the UE may obtain a single copy of the SIB information for all the subscriptions. That is, the UE can trigger an SI-RACH for only one of the subscriptions and not from all the subscriptions. After the SIBs are received on the selected subscription, the information may be used to configure the active Intra-PLMN subscriptions at the UE.

Figure 3:
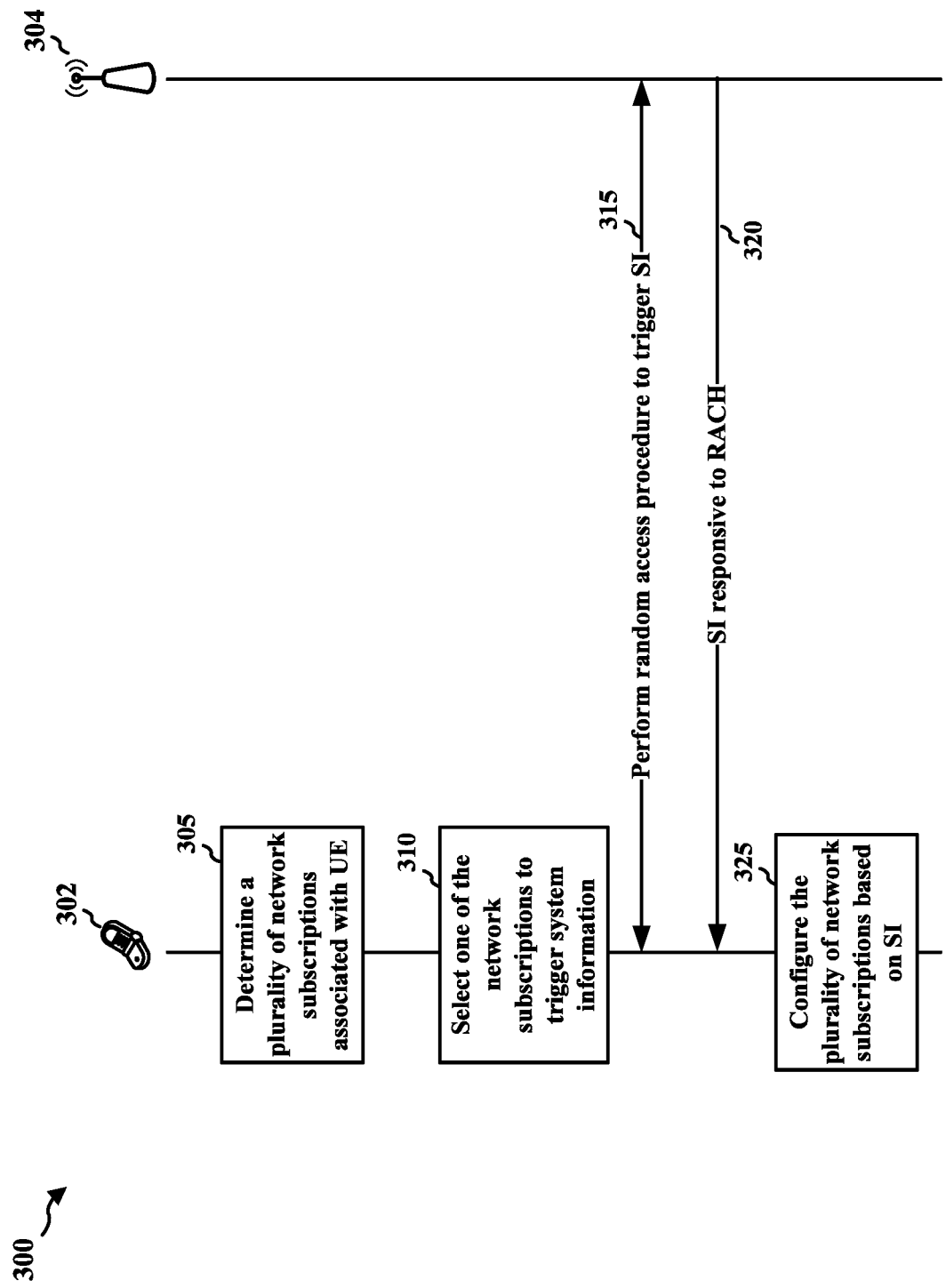
FIG. 3 is a communication diagram 300 illustrating signaling and operations performed by a UE and a base station according to some embodiments.

FIG. 3 is a communication diagram 300 illustrating signaling and operations performed by a UE 302 and a base station 304. Base station 304 may be a gNB. UE 302 may be a MSIM UE. The communication diagram illustrates an aspect of the invention, whereby the MSIM communication employs power-saving and network signaling overhead optimizations based on the MSIM Intra-PLMN status of the UE.

At 305, the UE 302 may determine a plurality of network subscriptions associated with the UE 302. For example, the UE 302 may determine that the two (or more) active subscriptions are associated with the same network. Since the subscriptions are located in the same device and may commonly use the same or similarly situated RF chains, they will usually attach to the same cell and/or beam.

At 310, the UE 302 may select one of the network subscriptions to trigger system information. The UE may select a network subscription based on signal strength (e.g., SSB RSRP, RSRQ, SS SNR) or based on other factors. Alternatively, the selected network subscription may be chosen randomly, based on a round-robin iteration, or based on other selection criteria. As the network subscriptions employ the same hardware, the delta of the signal strength between different network subscriptions may be relatively small.

At 315, the UE 302 may perform a random-access procedure to trigger the transmission of the system information by the base station 304. The random-access procedure may be performed on the selected network subscription from 310. As noted, the UE may select a specific RACH preamble that triggers downlink transmission of one or more on-demand SIBs.

At 320, the UE 302 may receive on-demand SIBs from the network in response to the random-access procedure performed at 315 on the selected network subscription.

At 325, the UE may configure the plurality of network subscriptions based on the system information. Accordingly, on-demand SIBS received at 320 may be associated with the selected network subscription. The UE may use the SIBs to configure other Intra-PLM network subscriptions.

Figure 4:
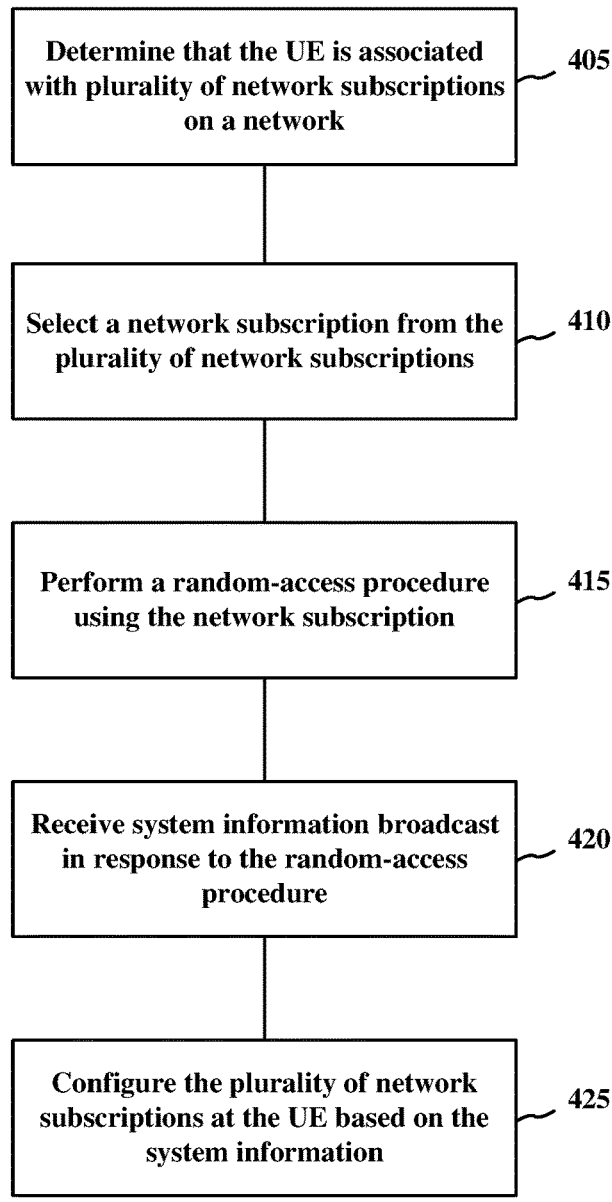
FIG. 4 is a flowchart of a method of wireless communication according to some embodiments.

FIG. 4 is a flowchart 400 of a method of wireless communication. The method may be performed by a UE (e.g., the UE 104, 250, 302; the apparatus 502/502'). The UE may be a MSIM Intra-PLMN UE. Optional aspects are illustrated with a dashed line. The method improves communication by a MSIM device by enabling a reduction in power consumption and overhead signaling.

At 405, the UE may determine that the UE is associated with the plurality of network subscriptions on a network. For example, UE may determine that it includes SIMs associated with a plurality of network subscriptions for the same network, as illustrated at 305 in FIG. 3. The plurality of subscriptions may include at least a 5G subscription and one of an LTE subscription or another 5G subscription.

At 410, the UE may select a network subscription from the plurality of network subscriptions for performing the random-access procedure. For example, the network subscription may be selected based on at least one channel quality measurement. The at least one channel quality measurement may include one or more of a SSB RSRP, a RSRQ, and/or a SS SNR. Alternatively, the UE may select the network subscription based on various factors, random selection, or in an iterative fashion, as described with respect to 310 in FIG. 3.

At 415, the UE may perform a random-access procedure using the network subscription selected at 410. For example, as illustrated at 315 in FIG. 3, the UE may perform an SI-RACH procedure using a preamble for triggering on-demand SIB transmissions.

At 420, the UE may receive system information broadcast in response to the random-access procedure. For example, the UE may receive one or more on-demand SIB s as illustrated at 320 in FIG. 3.

At 425, the UE may configure the plurality of network subscriptions at the UE based on the system information. Since the network subscriptions relate to the same network (i.e. Intra-PLMN) the plurality of network subscriptions may be configured with the system information.

Figure 5:
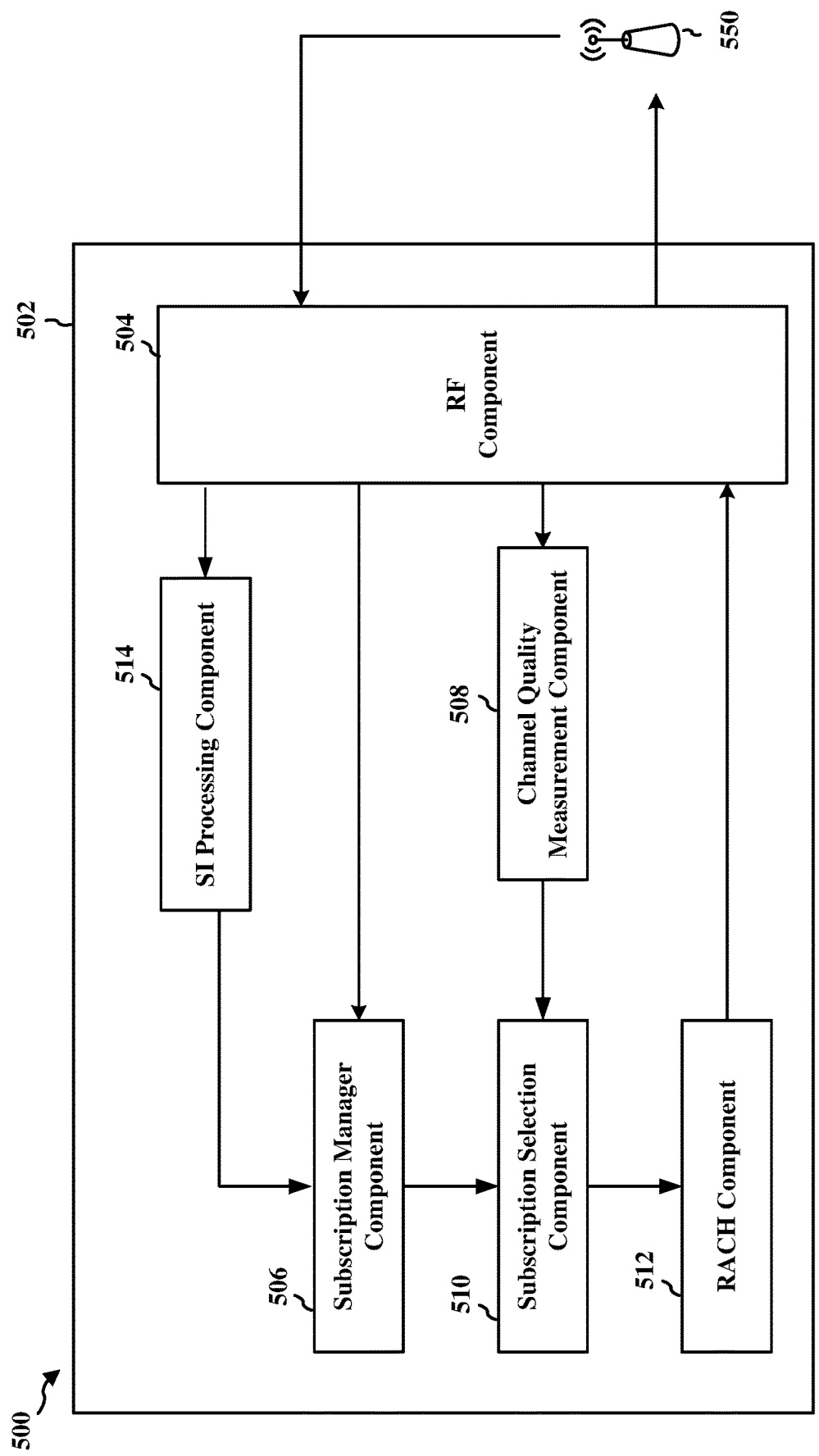
FIG. 5 is a conceptual data flow diagram illustrating the data flow between different means/components according to some embodiments.

FIG. 5 is a conceptual data flow diagram 500 illustrating the data flow between different means/components in an exemplary apparatus 502. The apparatus may be a UE. The apparatus includes an RF Component 504, Subscription Manager Component 506, Channel Quality Measurement Component 508, Subscription Selection Component 510, RACH Component 512, and SI Processing Component 514. RF Component 504 receives SSB and SIB transmissions from base station 550. Subscription Manager Component 506 may manage subscription context information and identify Intra-PLMN subscriptions at the UE. For example, if SI processing component 514 receives a SIB from the base station 550, Subscription Manager Component 506 may update the contexts for all the associated network subscriptions. Subscription Selection Component 510 selects a subscription for performing a random access procedure with the base station 550. Subscription Selection Component 510 may obtain channel measurements from Channel Measurement Component 508, which is used to select the network subscription for performing the random-access procedure. RACH Component 512 receives a network subscription selection from Subscription Selection Component 510, and perform a SI-RACH procedure to trigger on-demand SIB transmissions from the base station 550.

The apparatus may include additional components that perform each of the blocks of the algorithm in the aforementioned flowcharts of FIG. 3. As such, each block in the aforementioned flowcharts of FIG. 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
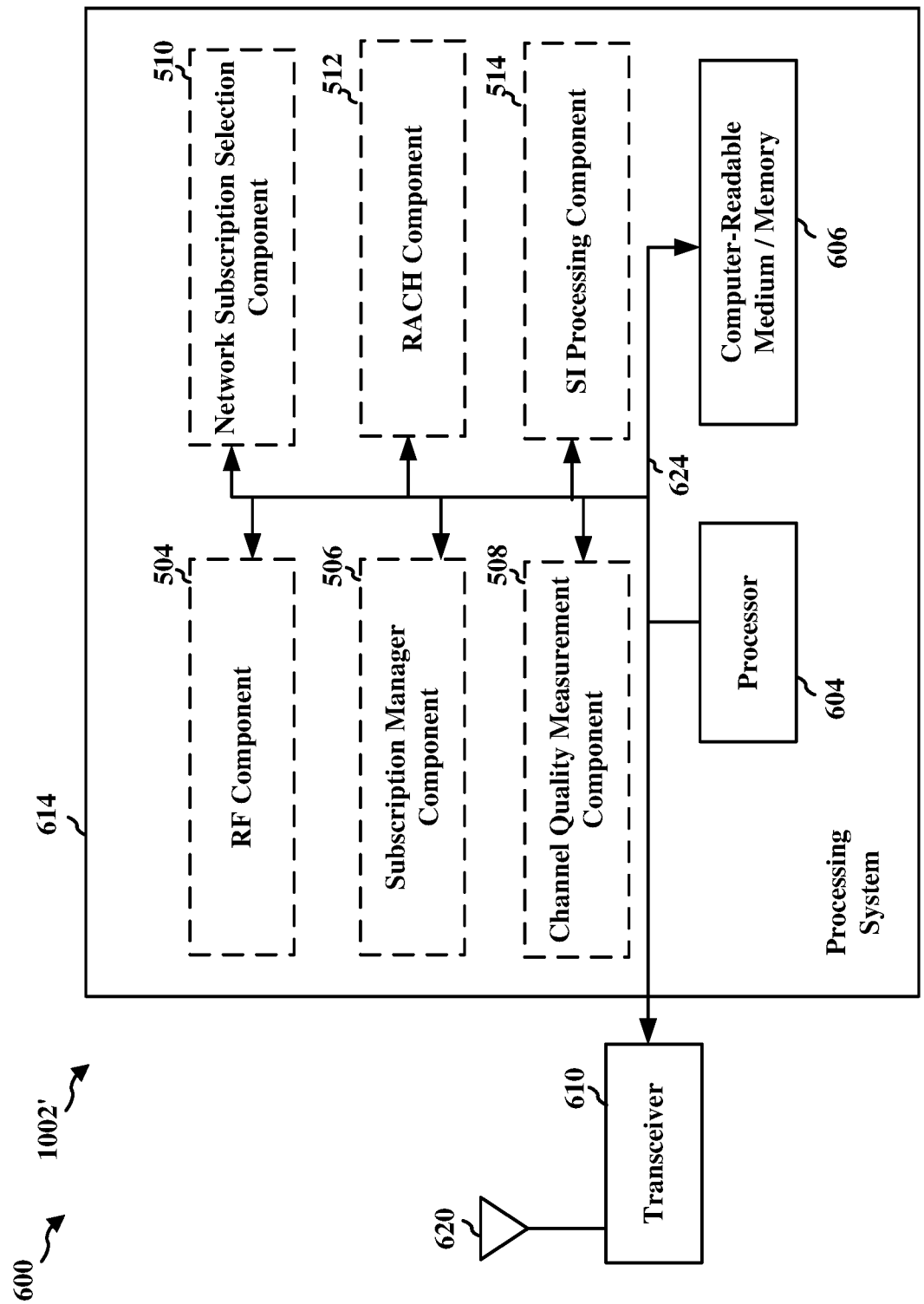
FIG. 6 is a diagram illustrating an example of a hardware implementation for an apparatus employing a processing system according to some embodiments.

FIG. 6 is a diagram 600 illustrating an example of a hardware implementation for an apparatus 602' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, RF component 504, RF component 504, subscription manager component 506, channel quality measurement component 508, subscription selection component 510, RACH component 512, SI processing component 514, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614. In addition, the transceiver 610 receives information from the processing system 614, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, 508, 510, 512, and 514. The components may be software components running in the processor 604, resident/stored in the computer readable medium/memory 606, one or more hardware components coupled to the processor 604, or some combination thereof. The processing system 614 may be a component of the UE 250 and may include the memory 260 and/or at least one of the TX processor 268, the RX processor 256, and the controller/processor 259.

In one configuration, the apparatus 502/502' for wireless communication includes means for determining that a UE is associated with plurality of network subscriptions, the plurality of network subscriptions being associated with a network, means for selecting a network subscription from the plurality of network subscriptions, means for performing a random-access procedure using the network subscription, means for receiving system information broadcast in response to the random-access procedure, the system information being associated with the network, and means for configuring the plurality of network subscriptions at the UE based on the system information.

The aforementioned means may be one or more of the aforementioned components of the apparatus 502 and/or the processing system 614 of the apparatus 502' configured to perform the functions recited by the aforementioned means. As described supra, the processing system 614 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), comprising:
    determining that the UE is associated with a plurality of network subscriptions, wherein the plurality of network subscriptions are associated with a network, and each of the plurality of network subscriptions is associated with a different subscriber identity module (SIM);
    selecting one network subscription from the plurality of network subscriptions;
    performing a single random-access procedure using the one network subscription;
    receiving system information broadcast for the one network subscription in response to the random-access procedure; and
    configuring the plurality of network subscriptions at the UE based on the system information for the one network subscription.

2. The method of claim 1, wherein the one network subscription is selected based on at least one channel quality measurement.

3. The method of claim 2, wherein the at least one channel quality measurement includes one or more of a synchronization signal block reference signal receive power, a reference signal receive quality, and a signal-to-noise-ratio associated with a synchronization signal.

4. The method of claim 1, wherein the plurality of network subscriptions are associated with the system information.

5. The method of claim 1, wherein the random-access procedure is a system information random-access channel procedure.

6. The method of claim 1, wherein the UE is a multi-SIM UE.

7. The method of claim 1, wherein the system information is received in an on-demand system information block.

8. The method of claim 1, wherein each of the plurality of network subscriptions is associated with a different PLMN subscription.

9. The method of claim 8, wherein the plurality of network subscriptions are Intra-PLMN subscriptions.

10. The method of claim 1, wherein the plurality of network subscriptions are configured based on the system information for the one network subscription received in response to the single random-access procedure.

11. An apparatus for wireless communication, comprising:
    means for determining that a UE is associated with a plurality of network subscriptions, wherein the plurality of network subscriptions are associated with a network, and each of the plurality of network subscriptions is associated with a different subscriber identity module (SIM);
    means for selecting one network subscription from the plurality of network subscriptions;
    means for performing a single random-access procedure using the one network subscription;
    means for receiving system information broadcast for the one network subscription in response to the random-access procedure; and
    means for configuring the plurality of network subscriptions at the UE based on the system information for the one network subscription.

12. The apparatus of claim 11, wherein the one network subscription is selected based on at least one channel quality measurement.

13. The apparatus of claim 12, wherein the at least one channel quality measurement includes one or more of a synchronization signal block reference signal receive power, a reference signal receive quality, and a signal-to-noise-ratio associated with a synchronization signal.

14. The apparatus of claim 11, where the plurality of network subscriptions are associated with the system information.

15. The apparatus of claim 11, wherein the random-access procedure is a system information random-access channel procedure.

16. The apparatus of claim 11, wherein the UE is a multi-SIM UE.

17. The apparatus of claim 11, wherein the system information is received in an on- demand system information block.

18. An apparatus for wireless communication, comprising:
    a memory; and
    at least one processor coupled to the memory and configured to:
        determine that the UE is associated with a plurality of network subscriptions, wherein the plurality of network subscriptions are associated with a network, and each of the plurality of network subscriptions is associated with a different subscriber identity module (SIM);

select one network subscription from the plurality of network subscriptions;

perform a single random-access procedure using the one network subscription;

receive system information broadcast for the one network subscription in response to the random-access procedure; and configure the plurality of network subscriptions at the UE based on the system information for the one network subscription.

19. The apparatus of claim 18, wherein the one network subscription is selected based on at least one channel quality measurement.

20. The apparatus of claim 19, wherein the at least one channel quality measurement includes one or more of a synchronization signal block reference signal receive power, a reference signal receive quality, and a signal-to-noise-ratio associated with a synchronization signal.

21. The apparatus of claim 18, where the plurality of network subscriptions are associated with the system information.

22. The apparatus of claim 18, wherein the random-access procedure is a system information random-access channel procedure.

23. The apparatus of claim 18, wherein the UE is a multi-SIM UE.

24. The apparatus of claim 18, wherein the system information is received in an on-demand system information block.

25. A non-transitory computer-readable medium storing computer executable code that, when executed by at least one processor at a user equipment, causes the at least one processor to:

determine that the UE is associated with a plurality of network subscriptions, wherein the plurality of network subscriptions are associated with a network, and each of the plurality of network subscriptions is associated with a different subscriber identity module (SIM);

select one network subscription from the plurality of network subscriptions;

perform a single random-access procedure using one network subscription;

receive system information broadcast for the one network subscription in response to the random-access procedure; and configure the plurality of network subscriptions at the UE based on the system information for the one network subscription.

26. The non-transitory computer-readable medium of claim 25, wherein the one network subscription is selected based on at least one channel quality measurement.

27. The non-transitory computer-readable medium of claim 26, wherein the at least one channel quality measurement includes one or more of a synchronization signal block reference signal receive power, a reference signal receive quality, and a signal-to-noise-ratio associated with a synchronization signal.

28. The non-transitory computer-readable medium of claim 25, wherein the plurality of network subscriptions are associated with the system information.

29. The non-transitory computer-readable medium of claim 25, wherein the random-access procedure is a system information random-access channel procedure.

30. The non-transitory computer-readable medium of claim 25, wherein the UE is a multi-SIM UE.

31. The non-transitory computer-readable medium of claim 25, wherein the system information is received in an on-demand system information block.

* * * * *